March 17, 1970  H. MEINUNGER  3,501,118
JOINT FOR LEGS OF SUPPORTS
Filed Sept. 29, 1967

INVENTOR
HELLMUT MEINUNGER

BY *John J. Gallagher*
ATTORNEY

United States Patent Office 3,501,118
Patented Mar. 17, 1970

3,501,118
JOINT FOR LEGS OF SUPPORTS
Hellmut Meinunger, Ispingrader-Strasse 29,
Radevormwald, Germany
Filed Sept. 29, 1967, Ser. No. 671,725
Claims priority, application Germany, Sept. 30, 1966,
K 60,357
Int. Cl. F16m 11/38, 11/02, 11/16
U.S. Cl. 248—166                                    9 Claims

ABSTRACT OF THE DISCLOSURE

A joint for supports having a head with slotted flanges mounted thereon. The support legs have a pivot pin therein and are formed to fit over the flanges with the pin fitted into the slot. The pin has, disposed thereon, annular discs which engage opposed surfaces of the flange to engage and retain the pin in the slot and provide pivotal connections between the head and the legs.

---

Applicant hereby claims the benefit of the filing date of German Patent Application Ser. No. K 60,357 of Sept. 30, 1966, pursuant to the provisions of 35 U.S.C. 119.

BACKGROUND OF THE INVENTION

This invention pertains generally to a pivotal joint between the head and legs of a support such, for example, as camera tripods and the like.

In the prior art, the conventional joint between a tripod leg and head is formed by providing transversely bored flanges on the tripod head. In assembling the tripod, a bifurcated transversely bored leg is disposed over the flange and a connecting pin is inserted longitudinally through the bores to provide a pivotal joint. For aesthetic, shielding and safety purposes, the prior art tripod generally has a shield disposed over the joints. Since the pins must be longitudinally inserted in the flange bore, it has hitherto been impossible to provide a tripod head support having an integral shield or cover construction since space must be provided for insertion of the pins. In the prior art structures, then, the cover must be assembled as a separate component after assembly of the pivotal joints.

SUMMARY OF THE INVENTION

This invention provides a tripod head having an integral cover for enclosing pivotal joints between the head and legs of a support such as a tripod. This is accomplished by furnishing a tripod head having slotted flanges for receiving leg mounted pivot pins. At least one annular disc is disposed on the pivot pin to engage the transverse face of the flange after assembly and, by embedding, retain the pin in the slot.

The invention also provides a novel pivot joint which may be assembled without the necessity of providing clearance longitudinally of the pivotal axis by furnishing a slotted component for transversely receiving a pivot pin. Members are mounted on the pin for engaging the transverse sides of the slotted component to retain the pin in the slot.

In a preferred embodiment, the invention provides a tripod head having slotted flanges extending therefrom. Each of the tripod legs has a pivotal pin comprising a threaded bolt disposed therethrough. Annular discs, having raised portions on a surface thereof, are disposed on each of the pins in such a manner that the raised portions engage the transverse sides of the flanges. The material from which the discs are fabricated is harder than the material of the webs and, upon insertion of the pin into the slots and subsequent tightening of the bolt, the raised portions of the disc are impressed into the web, thereby completing the joint with the pin retained in the slot. Since the pin is transversely inserted in the slot and longitudinal clearance is not required for the assembly, it is a particular advantage of this invention that the tripod head may be manufactured with an integral cover for enclosing the pivotal joints, thereby reducing the cost and complexity of fabrication.

These and other objects and advantages of the invention will become better understood to those skilled in the art by reference to the following detailed description wherein like components throughout the figures thereof are indicated by like numerals and wherein:

DESCRIPTION OF THE PREFERRED EMBODIMENT

Figure 1:
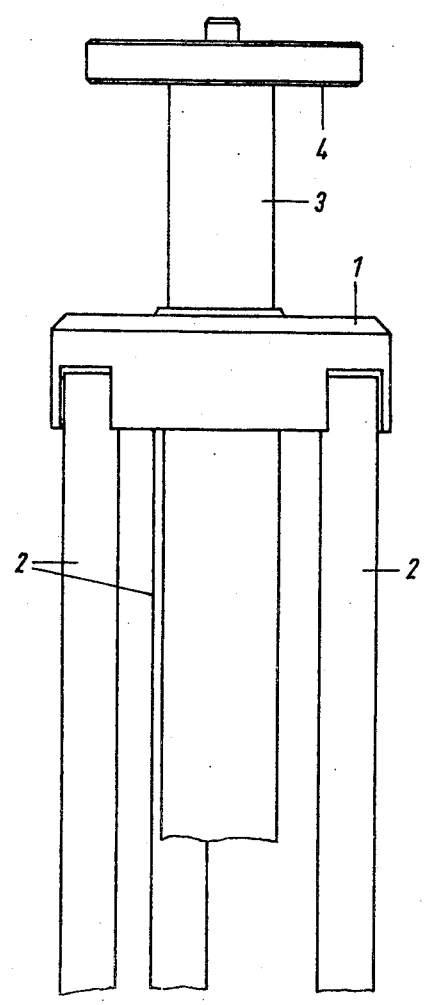
FIGURE 1 is a fragmentary elevational view of a tripod head and legs assembled in accordance with the invention.
Figure 3:
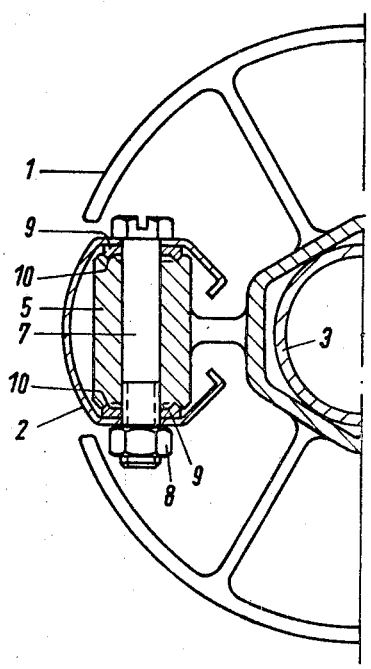
FIGURE 3 is a sectional view of the device of FIGURE 2 taken along the lines 3—3 thereof.

Referring now to FIGURE 1 of the drawings, a tripod head 1, having a generally annular cover depending from the periphery thereof, is provided with legs 2. The legs 2 are generally U-shaped in cross section as best seen in FIGURE 3. As is conventional, a central column 3 is movably mounted within the head 1 and carries a plate 4 on the upper end thereof on which a camera or like instrument can be mounted.

Figure 2:
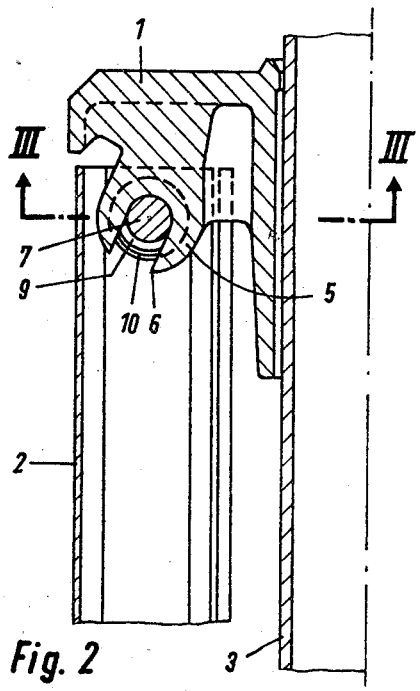
FIGURE 2 is an enlarged, fragmentary sectional view of the device of FIGURE 1.

Referring now more particularly to FIGURES 2 and 3, the head 1 has a flange 5 for each of the legs 2 extending therefrom. The flange is formed as a bushing which is provided with a downwardly and outwardly extending longitudinal slot 6. A pin, comprising a threaded bolt 7, with a nut 8 received on the end thereof, is disposed through openings in transverse walls of the legs 2 to bridge the opening therebetween and is received in the slot 6. A pair of discs 9, having inwardly extending projections 10 on a surface thereof, are disposed around the bolt 7 on either side of the flange 5 with the projection 10 adjacent the transverse faces of the flange. The discs 9 are assembled as illustrated and the nut 8 is loosely threaded on the bolt 7. The space between the arms of the legs 2 and the thickness of the discs 9 with their projecting edges 10 is such that the assembly fits over the flanges without interference between the components. The head 1 is constructed of a soft material such, for example, as aluminum, while the discs 9 are fabricated of a harder material such, for example, as steel. The bolt 7 is then inserted in the slot 6 of the flange 5 and the nut 8 is tightened to drive the projecting edges 10 into the transverse surfaces of the flange 5 to thereby fix the bolt 7 in the slot 6 and complete the pivotal joint.

The configuration of the projecting edges 10, although shown as an annular ring, may be other than as specifically illustrated such, for example, as one or more point shaped projections.

Although the slot 6 may extend in any desired direction, a downward and outward direction is preferable since, with this configuration, the head 1 may be readily cast as an integral part by the use of suitable pull pins in the casting apparatus.

What has been set forth above is intended primarily as exemplary of the teaching in accordance with the invention to enable those skilled in the art in the practice thereof. It should, therefore, be understood that, within the scope of the appended claims, the invention may be practiced other than as specifically described.

What is new and therefore desired to be protected by Letters Patent of the United States is:

What is claimed is:

1. In a support having a head with legs mounted thereon, a pivotal joint for connecting the legs to the head comprising:

a head having flanges extending therefrom; each of said flanges having a transverse slot formed therein;

a leg corresponding to each of said flanges, a pivot pin disposed through the upper end of said leg and receivable in said slot, at least one annular member of harder material than said head disposed around said pin, a raised portion including at least one blade disposed generally concentrically about said pin on said annular member in engagement with the transverse surface of said flange and means to embed said raised portion in said transverse surface to retain said pin in said slot.

2. An apparatus according to claim 1 wherein said head is fabricated of aluminum.

3. An apparatus according to claim 1 wherein the raised portion of said annular member comprises a circular concentrically disposed blade.

4. An apparatus in accordance with claim 1 wherein said annular member is fabricated of steel.

5. An apparatus in accordance with claim 1 wherein said pin comprises a bolt and a nut threaded on one end thereof.

6. An apparatus in accordance with claim 1 wherein said slots extend obliquely outwardly from said head.

7. An apparatus in accordance with claim 2 wherein said annular member is fabricated of steel.

8. An apparatus in accordance with claim 3 wherein said annular member is fabricated of steel.

9. An apparatus in accordance with claim 4 wherein said pin comprises a bolt and a nut threaded on one end thereof.

References Cited

UNITED STATES PATENTS

| | | | |
|---|---|---|---|
| 1,244,682 | 10/1917 | Akeley | 248—188 |
| 1,596,644 | 8/1926 | Wescott | 248—188 |
| 1,598,943 | 9/1926 | Tessier | 248—188 |
| 1,641,592 | 9/1927 | Kapps | 248—188 |
| 2,518,817 | 8/1950 | Ries | 248—168 |

FRANCIS K. ZUGEL, Primary Examiner

U.S. Cl. X.R.

258—177, 188